(12) United States Patent
Kim

(10) Patent No.: US 7,549,757 B2
(45) Date of Patent: Jun. 23, 2009

(54) DEVICE AND METHOD FOR ADJUSTING COLOR WHEEL INDEX

(75) Inventor: Kyo Soon Kim, Nonsan-si (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 11/159,321

(22) Filed: Jun. 23, 2005

(65) Prior Publication Data

US 2006/0007408 A1    Jan. 12, 2006

(30) Foreign Application Priority Data

Jul. 8, 2004    (KR) ...................... 10-2004-0052862

(51) Int. Cl.
G03B 21/14    (2006.01)

(52) U.S. Cl. .......................... 353/84; 353/31; 353/121; 348/743

(58) Field of Classification Search ................... 353/84, 353/31, 121; 348/742, 743, 771; 359/892, 359/885

See application file for complete search history.

(56) References Cited

U.S. PATENT DOCUMENTS

| | | | | |
|---|---|---|---|---|
| 5,448,314 A * | 9/1995 | Heimbuch et al. | ......... | 348/743 |
| 5,650,832 A * | 7/1997 | Poradish et al. | ............. | 348/743 |
| 6,054,832 A * | 4/2000 | Kunzman et al. | ........... | 318/600 |
| 6,256,425 B1 * | 7/2001 | Kunzman | .................... | 382/274 |
| 6,392,717 B1 * | 5/2002 | Kunzman | .................... | 348/744 |
| 6,642,970 B1 * | 11/2003 | Takeuchi et al. | ............ | 348/744 |
| 6,738,104 B2 * | 5/2004 | Marshall | ...................... | 348/743 |
| 6,830,343 B2 * | 12/2004 | Song | ........................... | 353/84 |
| 6,971,751 B2 * | 12/2005 | Wang | ........................... | 353/84 |
| 7,125,123 B2 * | 10/2006 | Kwon et al. | .................. | 353/84 |
| 2004/0008288 A1 * | 1/2004 | Pate et al. | .................... | 348/742 |
| 2007/0030401 A1 * | 2/2007 | Chien et al. | ................. | 348/743 |

FOREIGN PATENT DOCUMENTS

JP    9-127436 A    5/1997

* cited by examiner

*Primary Examiner*—William C Dowling
(74) *Attorney, Agent, or Firm*—Birch, Stewart, Kolasch & Birch, LLP

(57) ABSTRACT

A device and method for adjusting a color wheel index is provided. The method according to an embodiment includes adaptively controlling a color wheel index according to a user's selection of a color temperature.

15 Claims, 7 Drawing Sheets

DEVICE AND METHOD FOR ADJUSTING COLOR WHEEL INDEX

This application claims the priority benefit of the Korean Patent Application No. 10-2004-0052862 filed in Korea on Jul. 8, 2004, which is hereby incorporated by reference.

BACKGROUND OF THE INVENTION

1. Field of the Invention

The present invention relates to an image display device and a method for adjusting a color wheel index, and more particularly, to a device and method for adjusting a color wheel index value depending on a change of color temperature in a DLP optical system.

2. Description of the Related Art

A Digital Light Process (DLP) optical system compared to a Liquid Crystal Display (LCD) projection system employs a new display method using a light-reflecting element to achieve high definition of image quality.

The DLP optical system produces high definition and high brightness of image quality by selectively reflecting light and using an integrated circuit configured with thousands of light-reflecting elements.

The DLP optical system includes a Digital Micro-mirror Device (DMD) that is an integration of millions of micro mirrors depending on the resolution and signal-processing chips for controlling each mirror integrated in the DMD.

FIG. 1 is a view of a related art DLP optical system.

Referring to FIG. 1, the related art DLP optical system includes a lamp 10 for emitting light, a rod lens 11 through which the emitted light from the lamp 10 passes, a color wheel 12 for separating a white light passing through the rod lens 11 into red (R), green (G) and blue (B) lights, a condensing lens 13 for condensing the separated RGB lights provided by the color wheel 12, a prism 15 for reflecting the condensed lights toward a DMD 14, the DMD 14 for selectively reflecting the red, green and/or blue lights to generate appropriate color and projecting the reflected lights toward a projection lens 16, and the projection lens 16 for magnifying the reflected lights and directing the lights toward a screen 17.

Based on the above configuration, an operation of the related art DLP optical system will now be described. The white light emitted from the lamp 10 is concentrated by an internal curvature of a reflector and then the concentrated light passes through the light tunnel or the rod lens 11.

The rod lens 11 is provided by attaching four small and elongated mirrors facing one another. The light passing through the rod lens 11 is scattered and reflected, so that brightness distribution becomes uniform. The brightness of light that will be finally projected on the screen 17 needs to be uniform. The rod lens 11 performs this function and therefore it is an important optical element in a projection-type display device.

The light passing through the rod lens 11 is transmitted through the color wheel 12 for color separation. The color wheel 12 rotates depending on the vertical synchronization of an image.

Then the light passes through the condensing lens 13 and is reflected by the prism 15, so that the light is directed to the DMD 14. Depending on the angle of incidence, the prism 15 totally reflects or transmits the light.

The light incident on the DMD 14 is directed toward or out of the screen 17, depending on the on/off state of the micromirrors of the DMD 14 controlled in response to sampled pixel values.

The light reflected on the DMD 14 and directed toward the screen 17 passes through the projection lens 16. Then, the light is magnified by the projection lens 16 and is projected on the screen 17.

FIG. 2 is a view illustrating the color wheel 12 of the related art DLP optical system.

Referring to the FIG. 2, the color wheel 12 is driven by a DC motor 17 and RGB filters are attached to the color wheel 12.

To synchronize a rotational speed of the color wheel 12 and a color phase with a synchronous signal of an image signal, a color wheel index mark 18 is attached to the color wheel 12.

The R, G and B filters can be attached to the color wheel 12 in three equal parts of 360 degrees. In another example, two R filters, two G filters and two B filters can be attached in six equal parts of 360 degrees. In such a case, the DC motor 17 can reduce the rotational speed that is required for the light to pass through one color filter.

The size of the light passing through the rod lens 11 is called a "spot size". When the light is on the boundary between the RGB filters, primary color light is not formed. Thus, such a light is not used in image representation. However, if the lights on all boundaries are collected, the white color light is formed, which is used to represent a white color.

The index mark 18 is used as a recognition index to synchronize the rotational speed of the color wheel 12 and the color phase with the synchronous signal of the image signal. The index mark 18 can be provided with a light-absorbing-black tape or paint.

The speed of the color wheel 12 rotated by the DC motor 17 and the color phase are synchronized with the synchronous signal by irradiating infrared rays toward the index mark 18 and detecting the reflected infrared rays.

Sometimes, however, the index mark 18 may be attached at a position of the color wheel 12 that is different from the preset position. In case that the index mark 18 is out of the preset position, the image signal is not synchronized with the light from the color wheel 12 so that high image quality is not produced. Therefore, specific software can be used to recognize the position of the index mark 18.

An adjustment value to recognize the position of the index mark 18 is called a color wheel index value. The DLP optical system controls a rotational speed and a color phase properly by using the color wheel index value.

FIGS. 4 to 6 illustrate chromaticity (color) coordinates for different temperature modes according to the related art. Particularly, FIGS. 4 to 6 show chromaticity coordinates of RGB colors for a cool mode, a medium mode, and a warm mode, respectively. In FIG. 4, a region 50 provides standard RGB color coordinates for obtaining the cool mode of color. In FIG. 5, a region 52 provides standard RGB color coordinates for obtaining the medium mode of color. In FIG. 6, a region 54 provides standard RGB color coordinates for obtaining the warm mode of color. As shown, the chromaticity (color) coordinates in the region 54 for the warm mode are generally higher than those for the cool mode in the region 50.

According to the related art, the color wheel index value is pre-set in one mode of color temperature (the medium mode, the cool mode, or the warm mode) and stays fixed at the set color wheel index throughout use. That is, generally at the manufacturing stage, the color wheel index is set to the medium mode. Thereafter the color wheel index cannot be changed and stays fixed at the set index value. An end user of the DLP optical system cannot change the color wheel index preset by the manufacturer or the like. As a result, if the color wheel index is set to be in the medium mode and then the color temperature of an image is changed into a cool mode or a warm mode, there occurs a problem of color bands since the color wheel index cannot be changed to correspond to the changed color temperature.

FIG. 3A is a view of an adjustment picture when the color wheel index is set in the medium mode, and FIG. 3B is a view of an adjustment picture showing undesired color bands 50 generated when the color wheel index is set in the medium mode but the color temperature is then changed into the cool mode. As can be seen from FIG. 3B, the undesired color bands 50 occur in some portions of the adjustment picture and degrade the picture quality.

As mentioned above, once the color wheel index is set in one mode of the color temperature and the color temperature is changed into another mode, there is a problem of color bands that deteriorate the picture quality.

According to the related art, as discussed above color bands occur as the color temperature mode is changed and this phenomenon is caused by difference between RGB gain and offset. Accordingly, the difference between the RGB gain and the offset needs to be adjusted properly. That is, once the color wheel index is set in the medium mode, the color bands shown in FIG. 3B occur due to the difference of the chromaticity coordinates for the different color temperature modes, which degrade the picture quality.

SUMMARY OF THE INVENTION

Accordingly, the present invention is directed to an image display device and a method for adjusting a color wheel index that substantially obviates one or more problems due to limitations and disadvantages of the related art.

An object of the present invention is to provide a device and method for adjusting a color wheel index, capable of providing high quality image when a color temperature of a picture is changed.

Another object of the present invention is to provide a device and method for controlling a color wheel, capable of properly adjusting a color wheel index value depending on a color temperature of a picture.

A further object of the present invention is to provide a device and method for adjusting a color wheel index, capable of preventing undesired color from occurring in a picture depending on a change of color temperature.

Another object of the present invention is to provide a device and method of adjusting a phase of a color wheel to correspond with a changing color temperature.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided according to an aspect of the present invention a method of controlling a color wheel, the method comprising: adaptively controlling a color wheel index according to a user's selection of a color temperature.

According to an aspect of the present invention, there is provided a method of controlling a color wheel, the method comprising: adaptively controlling a phase of the color wheel according to a user's selection of a color temperature.

According to an aspect of the present invention, there is provided a device for controlling a color wheel, the device comprising: a controller to adaptively control a color wheel index according to a user's selection of a color temperature.

According to an aspect of the present invention, there is provided an image display device comprising: a controller to adaptively control a color wheel index according to a user's selection of a color temperature, and a display unit to display an image according to the controlled color wheel index.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

According to the present invention, a phase of a color wheel used in a DLP optical system or other system is controlled to correspond with the currently selected color temperature mode. This can be achieved by adjusting the color wheel index value of the color wheel. The phase of the color wheel is used to control the color phase and the rotating speed of the color wheel. By adjusting the phase of the color wheel index, the speed of the color wheel is controlled so that it emits separated RGB lights at certain speed/intervals for the processing by the DMD, synchronous with the image signal.

Figure 7:
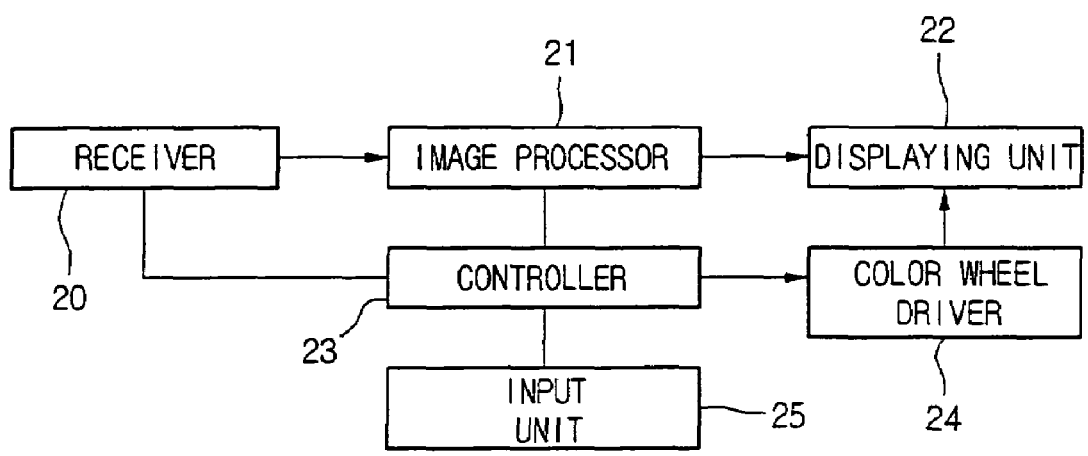
FIG. 7 is a schematic view illustrating a construction of an image display device using a DLP optical system according to an embodiment of the present invention.

FIG. 7 is a schematic view illustrating a construction of an image display device using a DLP optical system according to an embodiment of the present invention. Referring to FIG. 7, the image display device includes: a receiver 20 for receiving image data; an image processor 21 for converting the received image data into a displayable image signal; a displaying unit 22 for displaying an image by using the image signal from the image processor 21 and RGB lights from a color wheel of the DLP optical system; a color wheel driver 24 for driving the color wheel; a controller 23 for controlling the color wheel driver 24 to display an image in a color temperature selected by a user depending on a control instruction inputted by a user such as a viewer; an input unit 25 for allowing the user to input the control instruction and other commands. All the components of the image display device are operatively coupled.

Figure 1:
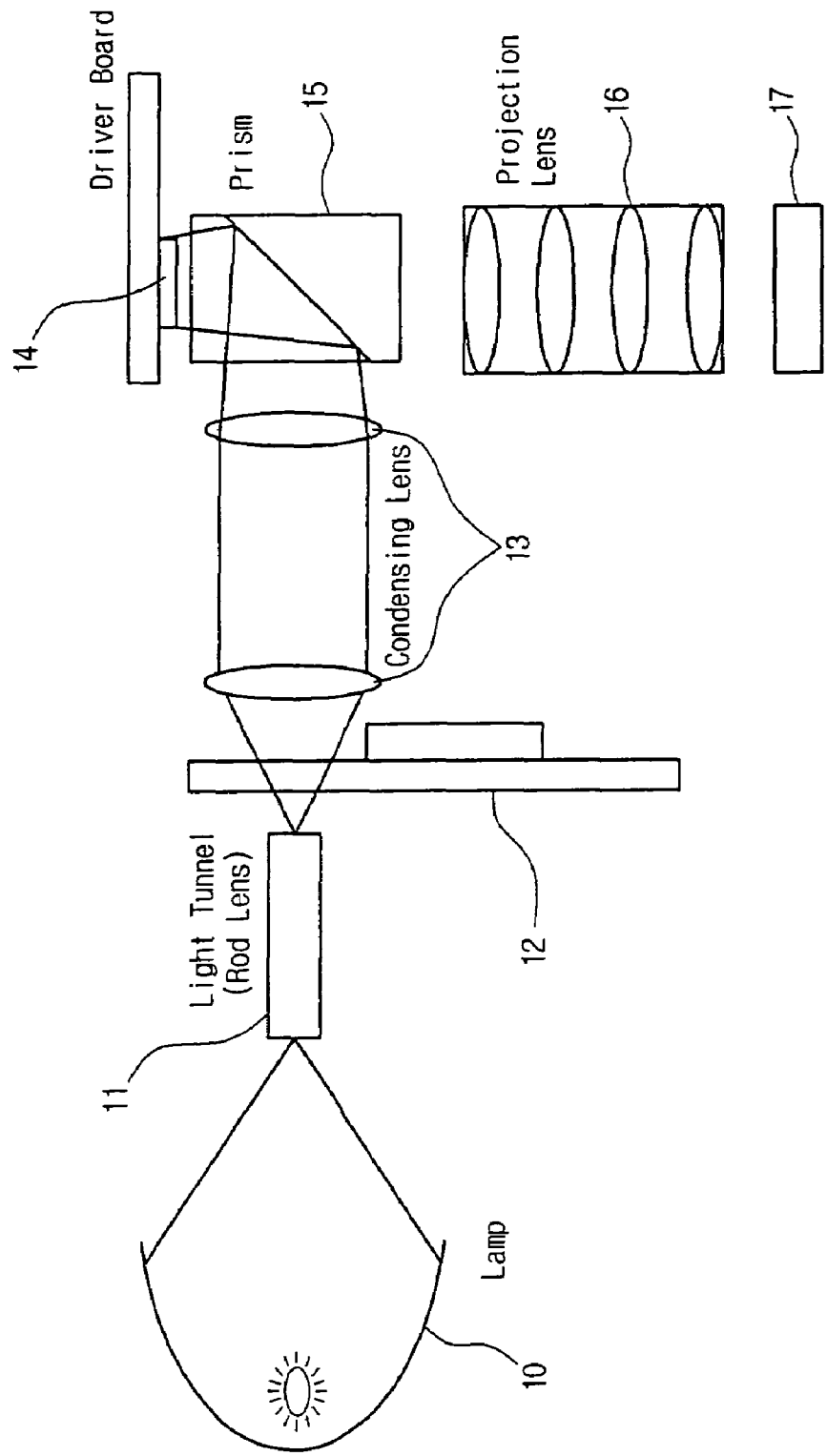
FIG. 1 is a view of a related art DLP optical system.
Figure 2:
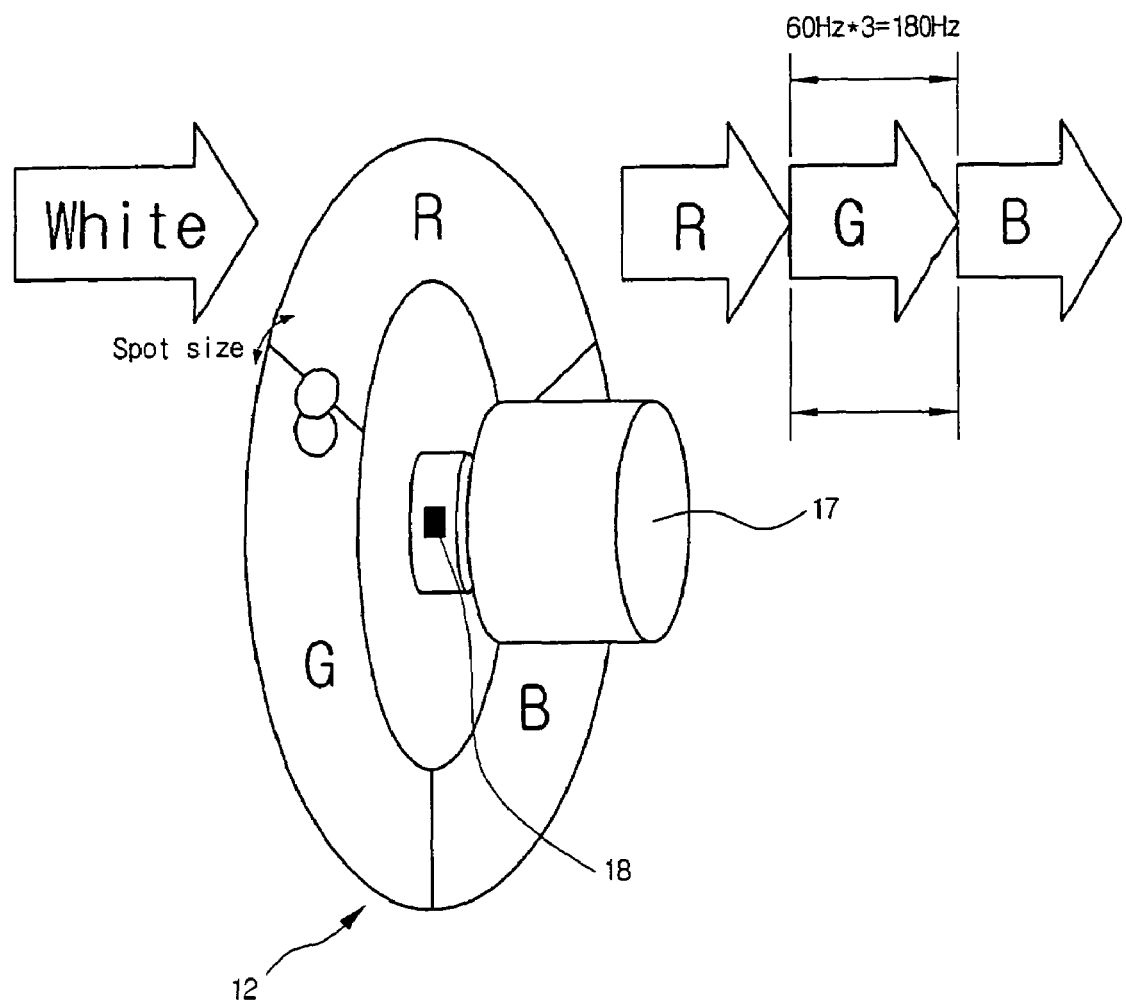
FIG. 2 is a view of a color wheel of the DLP optical system of FIG. 1.
Figure 3A:
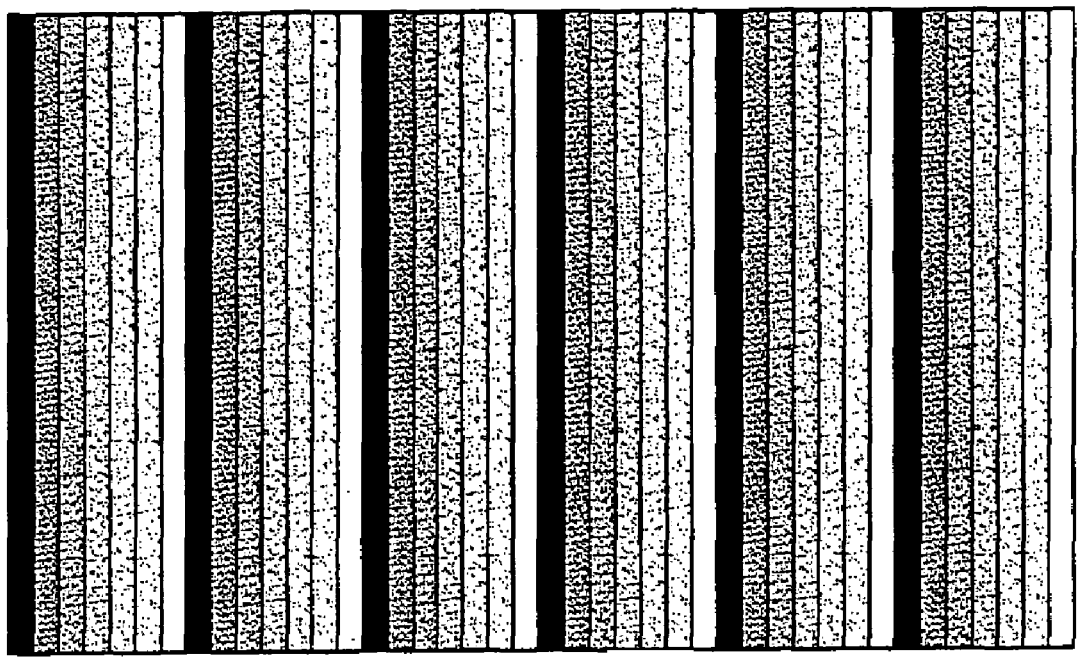
FIGS. 3A and 3B are views illustrating adjustment pictures when a color wheel index is set in a specific mode of color temperature and then the color temperature is changed.
Figure 3B:
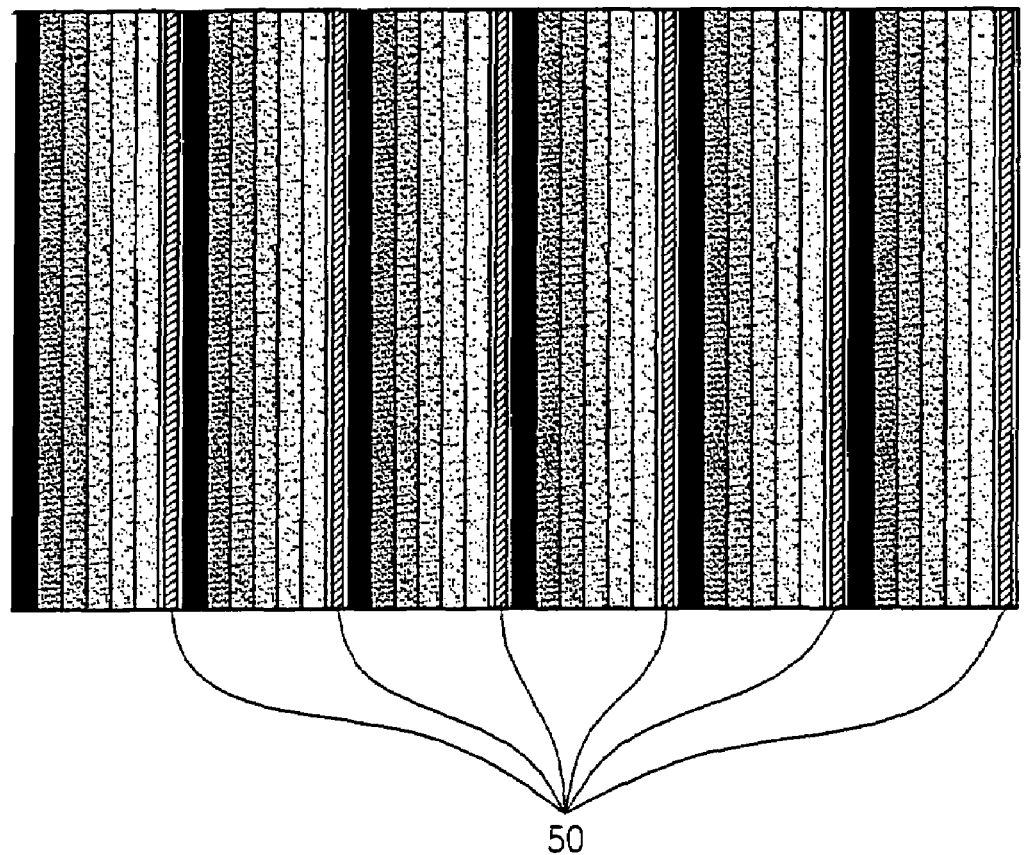
Figure 4:
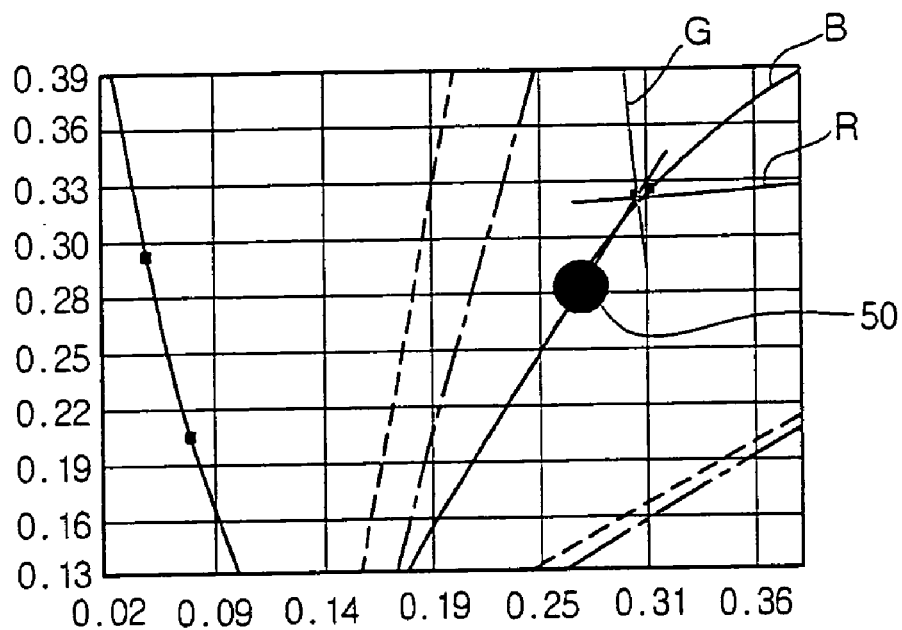
FIGS. 4 to 6 illustrate examples of chromaticity coordinates for different color modes according to the related art.
Figure 5:
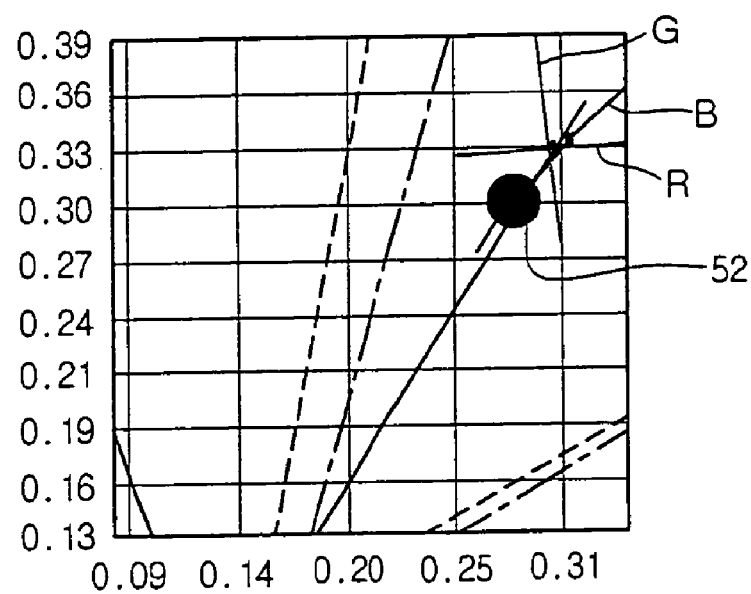
Figure 6:
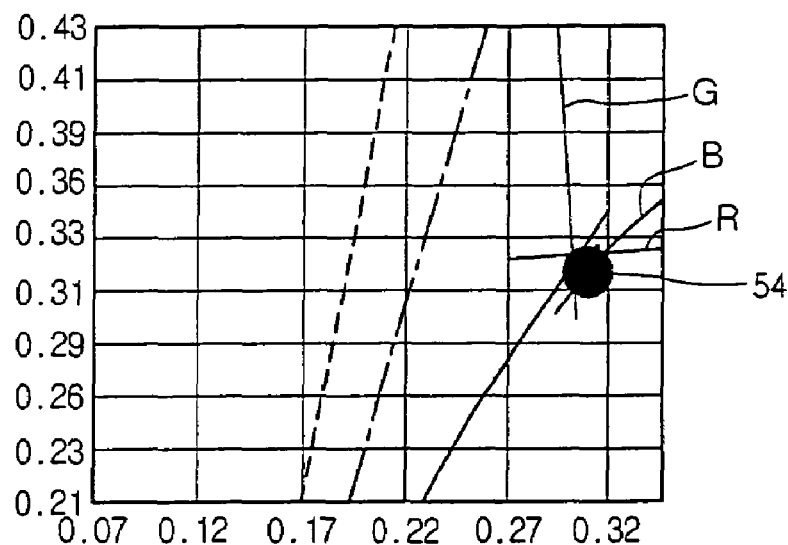

The DLP optical system used in connection with the image display device of FIG. 7 can be the DLP optical system shown in FIG. 1 or other type of DLP optical system. The image display device with the DLP optical system can project broadcast programs, DVD signals, etc.

The input unit 25 may be a remote control receiver for receiving a control signal from a remote controller. The input unit 25 receives a specific color temperature (mode) desired by the user as part of the user input for displaying pictures in the desired color temperature mode.

The controller 23 refers to a synchronous signal of the image signal and a color wheel index value and provides the color wheel driver 24 with a control signal for driving the color wheel.

The controller 23 controls the color wheel driver 24 by applying a preset adjustment value to the color wheel index value for the color wheel that is set in the medium mode (e.g., at the manufacturing stage), depending on the color temperature inputted by the user. For example, when the user has selected to change the color temperature into a cool mode or warm mode, the controller 23 controls the color wheel driver 24 by adding or subtracting the preset adjustment value to or from the color wheel index value set in the medium mode.

If the color wheel index value is initially set to be 10, then the adjustment value can be set to 2. In this case, the color wheel index value to which the adjustment value is reflected becomes 8 or 12. That is, the adjustment value can be set to +2 in the cool mode, 0 in the medium mode, and +2 in the warm mode.

An optimum color temperature can change depending on the color temperature modes. The adjustment value for the color temperature that can be selected by the user is calculated in advance, and a corresponding adjustment value is applied when the user selects a specific color temperature. In this manner, it is possible to adaptively and actively cope with the change of the color temperature selected by the user.

The rotational phase of the color wheel becomes faster or slower as the adjustment value is applied to the initially set color wheel index value. The resulting phase change of the color wheel (e.g., the wheel 12) provides optimized and high quality image display since the phase of the color wheel is adaptively changed to correspond with the change in the color temperature as selected by the user.

Figure 8:
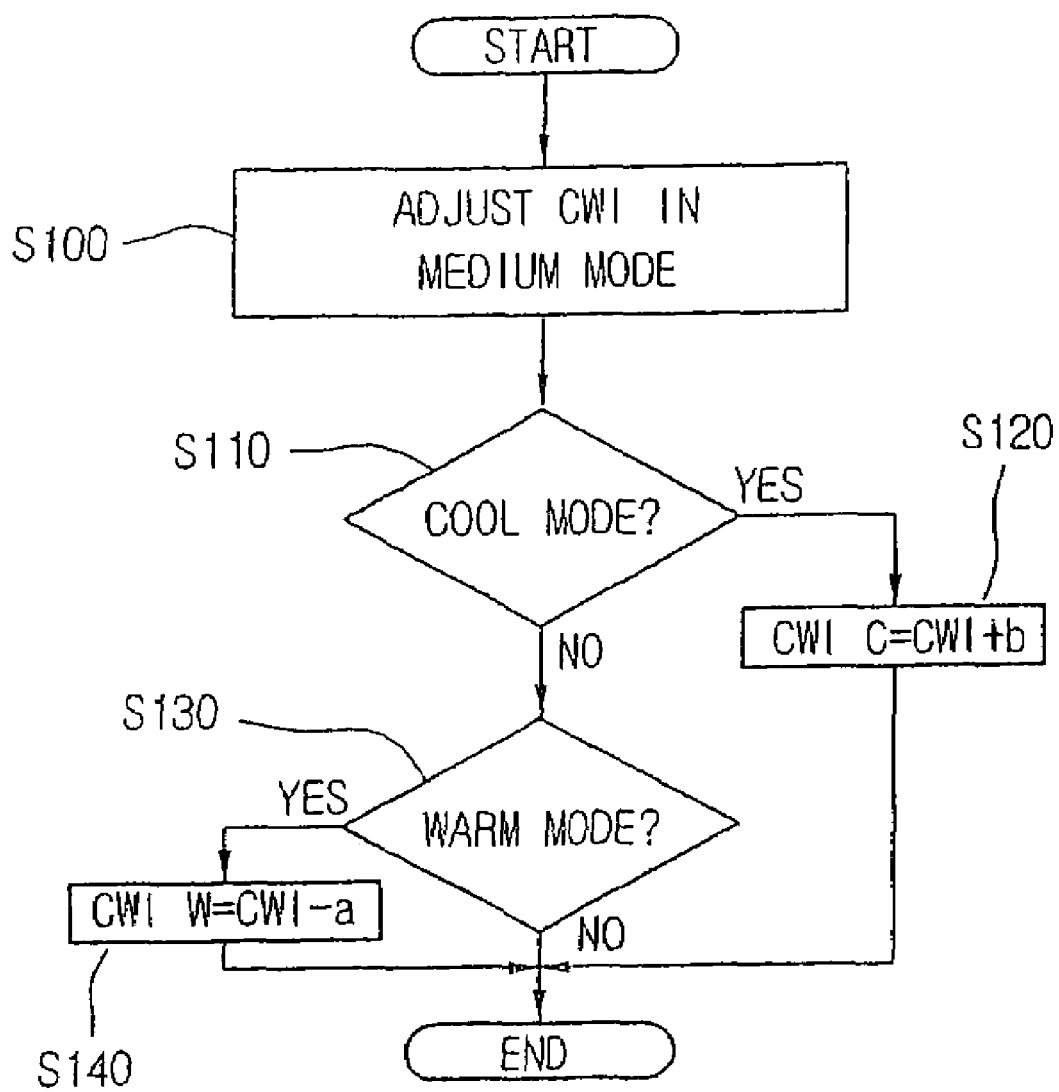
FIG. 8 is a flowchart illustrating a method for adjusting a color wheel index according to an embodiment of the present invention.

FIG. 8 is a flowchart illustrating a method for adjusting the color wheel index according to an embodiment of the present invention. This method can be implemented by the image display device of FIG. 7 or other suitable device/system.

Referring to FIG. 8, a color wheel index value (CWI) is initially set to be in the medium mode, e.g., at the image display device manufacturing stage (S100).

Thereafter, a color temperature of a displaying picture can change depending on a user's selection of a preferred color temperature mode. In this process, if the user selects the cool mode via the input unit 25, a color wheel index value (CWI C) of the cool mode is generated by adding the initially-set color wheel index value (CWI) to a preset adjustment value (b) (S110, S120). If the user selects the warm mode, a color wheel index (CWI W) value of the warm mode is generated by subtracting a preset adjustment value (a) from the initially-set color wheel index value (CWI) (S130, S140). Here, the preset adjustment values can be different or the same. The adjusted color wheel index value is implemented in the color wheel by the operation of the color wheel driver 24.

Accordingly, the deterioration of image quality can be prevented by adaptively changing the color wheel index value to correspond with the color temperature change whenever the user changes the color temperature for images to be displayed.

Here, although the values a and b can change depending on models of the image display device, it is preferable that the values a and b are each in the range from 2 to 6.

According to the present invention, pictures that change sensitively depending on the color temperature can be maintained with high quality by adaptively adjusting the color wheel index value as discussed herein.

The present invention provides the apparatus and method for controlling the color wheel, capable of effectively enhancing the image quality depending on the color temperature selected by the user.

Further, the present invention can display high quality of image by changing only the color wheel index value without the use of any additional device or manipulation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling a color wheel in a projection system, the method comprising:
    setting an initial color wheel index value with reference to a predetermined color temperature;
    applying an adjustment value of a color wheel index value to an initial color wheel index value with reference to a predetermined color temperature depending on a selection of a color temperature; and
    controlling a color wheel by using the adjusted color wheel index value,
    wherein the color wheel is provided with an index mark used for synchronizing the rotation of the color wheel with an image signal, and
    wherein the color wheel index value is provided for controlling a rotational speed and a color phase of color wheel.

2. The method of claim 1, wherein the color temperature is selected by a user.

3. The method of claim 1, wherein the predetermined color temperature is a medium mode.

4. The method of claim 1, wherein the adjustment value is in the range from 2 to 6.

5. The method of claim 1, wherein the adjustment value is added to or subtracted from the initial color wheel index value depending on the selected color temperature.

6. The method of claim 1, wherein the selection of the color temperature is one of the following color temperature modes: a cool mode, a medium mode and a warm mode.

7. The method of claim 1, wherein the index mark is an index of a color wheel filter in a digital light process (DLP) optical system.

8. A device for controlling a color wheel in a projection system, the device comprising:
    an input unit to receive selection of a color temperature;
    a controller configured to set an initial color wheel index value of the color wheel with reference to a predetermined color temperature, and to output an adjustment value of the color wheel index value corresponding to the selected color temperature to a color wheel driver depending on selection of the color temperature; and a color wheel driver controlled by the controller and controlling the color wheel, wherein the color wheel driver applies the adjustment value to the initial color wheel index value of the color wheel depending on the adjustment value of the color wheel index value outputted from the controller.

9. The device of claim 8, wherein the color temperature is selected by a user.

10. The device of claim 8, wherein the predetermined color temperature is a medium mode.

11. The device of claim 8, wherein the adjustment value is in the range from 2 to 6.

12. The device of claim 8, wherein the adjustment value is added to or subtracted from the initial color wheel index value depending on the selected color temperature.

13. The device of claim 8, wherein the selection of the color temperature includes one of the following color temperature modes: a cool mode, a medium mode and a warm mode.

14. The device of claim 8, wherein the color wheel is part of a digital light process (DLP) optical system.

15. The device of claim 8, further comprising a display unit configured to display an image according to the controlled color wheel.

* * * * *